(12) United States Patent
Wiggers et al.

(10) Patent No.: US 11,579,909 B2
(45) Date of Patent: Feb. 14, 2023

(54) HONORING RESOURCE SCHEDULER CONSTRAINTS DURING MAINTENANCES

(71) Applicant: VMWARE, INC., Palo Alto, CA (US)

(72) Inventors: Maarten Wiggers, Palo Alto, CA (US); Gabriel Tarasuk-Levin, Palo Alto, CA (US); Manoj Krishnan, Thrissur (IN)

(73) Assignee: VMware, Inc., Palo Alto, CA (US)

( * ) Notice: Subject to any disclaimer, the term of this patent is extended or adjusted under 35 U.S.C. 154(b) by 433 days.

(21) Appl. No.: 16/446,670

(22) Filed: Jun. 20, 2019

(65) Prior Publication Data

US 2020/0042340 A1  Feb. 6, 2020

(30) Foreign Application Priority Data

Jul. 31, 2018 (IN) .............................. 201841028751

(51) Int. Cl.
*G06F 9/46* (2006.01)
*G06F 9/455* (2018.01)
*G06F 9/50* (2006.01)

(52) U.S. Cl.
CPC ........ *G06F 9/45558* (2013.01); *G06F 9/5077* (2013.01); *G06F 9/45541* (2013.01); *G06F 2009/4557* (2013.01); *G06F 2209/502* (2013.01); *G06F 2209/505* (2013.01); *G06F 2209/506* (2013.01); *G06F 2209/5014* (2013.01)

(58) Field of Classification Search
CPC ............... G06F 9/45558; G06F 9/5077; G06F 9/45541; G06F 2009/4557; G06F 2209/5014; G06F 2209/502; G06F 2209/505; G06F 2209/506
See application file for complete search history.

(56) References Cited

U.S. PATENT DOCUMENTS

| | | | |
|---|---|---|---|
| 6,698,017 B1 * | 2/2004 | Adamovits | G06F 8/656 717/168 |
| 9,928,099 B1 * | 3/2018 | Surani | G06F 9/45558 |
| 10,613,893 B2 * | 4/2020 | Yadav | G06F 3/0617 |
| 2009/0070771 A1 * | 3/2009 | Yuyitung | G06Q 10/06 718/105 |
| 2010/0169253 A1 * | 7/2010 | Tan | G06F 9/5088 706/21 |

\* cited by examiner

*Primary Examiner* — Wissam Rashid
(74) *Attorney, Agent, or Firm* — Dentons US LLP

(57) ABSTRACT

The present disclosure describes a technique for honoring virtual machine placement constraints established on a first host implemented on a virtualized computing environment by receiving a request to migrate one or more virtual machines from the first host to a second host and without violating the virtual machine placement constraints, identifying an architecture of the first host, provisioning a second host with an architecture compatible with that of the first host, adding the second host to the cluster of hosts, and migrating the one or more virtual machines from the first host to the second host.

26 Claims, 7 Drawing Sheets

HONORING RESOURCE SCHEDULER CONSTRAINTS DURING MAINTENANCES

RELATED APPLICATIONS

Benefit is claimed under 35 U.S.C. 119(a)-(d) to Foreign Application Serial No. 201841028751 filed in India entitled "HONORING RESOURCE SCHEDULER CONSTRAINTS DURING MAINTENANCES", on Jul. 31, 2018, by VMWARE, INC., which is herein incorporated in its entirety by reference for all purposes.

FIELD

The present disclosure generally relates to a distributed resource scheduler (DRS) for virtual machines (VMs) within a cluster of hosts and, more specifically, to a technique for managing migration of virtual machines.

BACKGROUND

Virtualized computing environments have evolved from implementations including a single host executing one or more virtual machines, to implementations including a cluster of hosts in which each host executes one or more virtual machines. One reason for this evolution is to provide an environment in which a system may load balance virtual machines executing on an overloaded host by migrating virtual machines of the overloaded host to a less loaded host within the cluster, thereby increasing overall performance and efficiency. To assist in the load balancing effort, virtual machine placement constraints are frequently implemented. In general, however, it is often not feasible to perform a rolling patch/upgrade without violating virtual machine placement constraints and requesting administrator intervention. As such, an existing challenge is to update a host running virtual machines within a cluster of hosts without violating one or more virtual machine placement constraints.

SUMMARY

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some examples, a non-transitory computer-readable storage medium storing one or more programs configured to be executed by one or more processors of an electronic device within a cluster of hosts for honoring virtual machine placement constraints established on a first host, the one or more programs including instructions for: receiving a request to migrate one or more virtual machines from the first host to a second host; and without violating the virtual machine placement constraints: identifying an architecture of the first host; provisioning the second host with an architecture that is compatible with the architecture of the first host; adding the second host to the cluster of hosts; and migrating the one or more virtual machines from the first host to the second host.

In some examples, the one or more programs of the computer-readable storage medium is further configured with instruction for determining whether the one or more virtual machines on the first host have been evacuated; and in accordance with the determination that the one or more virtual machines on the first host have been evacuated, performing maintenance on the first host. In some examples, the one or more programs of the computer-readable storage medium is further configured with instruction for determining whether the one or more virtual machines on the first host have been evacuated; and in accordance with the determination that the one or more virtual machines on the first host have been evacuated, optionally power cycling the first host. In some examples, the one or more programs of the computer-readable storage medium is further configured with instruction for migrating the one or more virtual machines from the second host to the first host until the second host is evacuated; and removing the second host from the cluster of hosts.

In accordance with some examples, an electronic device within a cluster of hosts for honoring virtual machine placement constraints established on a first host, comprising: a network interface; a disk interface surface; one or more processors; and memory storing one or more programs configured to be executed by the one or more processors, the one or more programs including instructions for: receiving a request to migrate one or more virtual machines from the first host to a second host; and without violating the virtual machine placement constraints: identifying an architecture of the first host; provisioning the second host with an architecture that is compatible with the architecture of the first host; adding the second host to the cluster of hosts; and migrating the one or more virtual machines from the first host to the second host.

In some examples, the one or more programs of the electronic device further include instructions for determining whether the one or more virtual machines on the first host have been evacuated; and in accordance with the determination that the one or more virtual machines on the first host have been evacuated, performing maintenance on the first host. In some examples, the one or more programs of the electronic device further include instructions for determining whether the one or more virtual machines on the first host have been evacuated; and in accordance with the determination that the one or more virtual machines on the first host have been evacuated, optionally power cycling the first host. In some examples, the one or more programs of the electronic device further include instructions for migrating the one or more virtual machines from the second host to the first host until the second host is evacuated; and removing the second host from the cluster of hosts.

In accordance with some examples, a method of honoring virtual machine placement constraints established on a first host within a cluster of hosts, the method comprising: receiving a request to migrate one or more virtual machines from the first host to a second host; and without violating the virtual machine placement constraints: identifying an architecture of the first host; provisioning the second host with an architecture that is compatible with the architecture of the first host; adding the second host to the cluster of hosts; and migrating the one or more virtual machines from the first host to the second host.

In some examples, the method further includes determining whether the one or more virtual machines on the first host have been evacuated; and in accordance with the determination that the one or more virtual machines on the first host have been evacuated, performing maintenance on the first host. In some examples, the method further includes determining whether the one or more virtual machines on the first host have been evacuated; and in accordance with the determination that the one or more virtual machines on the first host have been evacuated, optionally power cycling the first host. In some examples, the method further includes migrating the one or more virtual machines from the second host to the first host until the second host is evacuated; and removing the second host from the cluster of hosts.

BRIEF DESCRIPTION OF THE DRAWINGS

For a better understanding of the various described examples, reference should be made to the description below, in conjunction with the following figures in which like-referenced numerals refer to corresponding parts throughout the figures.

DETAILED DESCRIPTION

Figure 1:
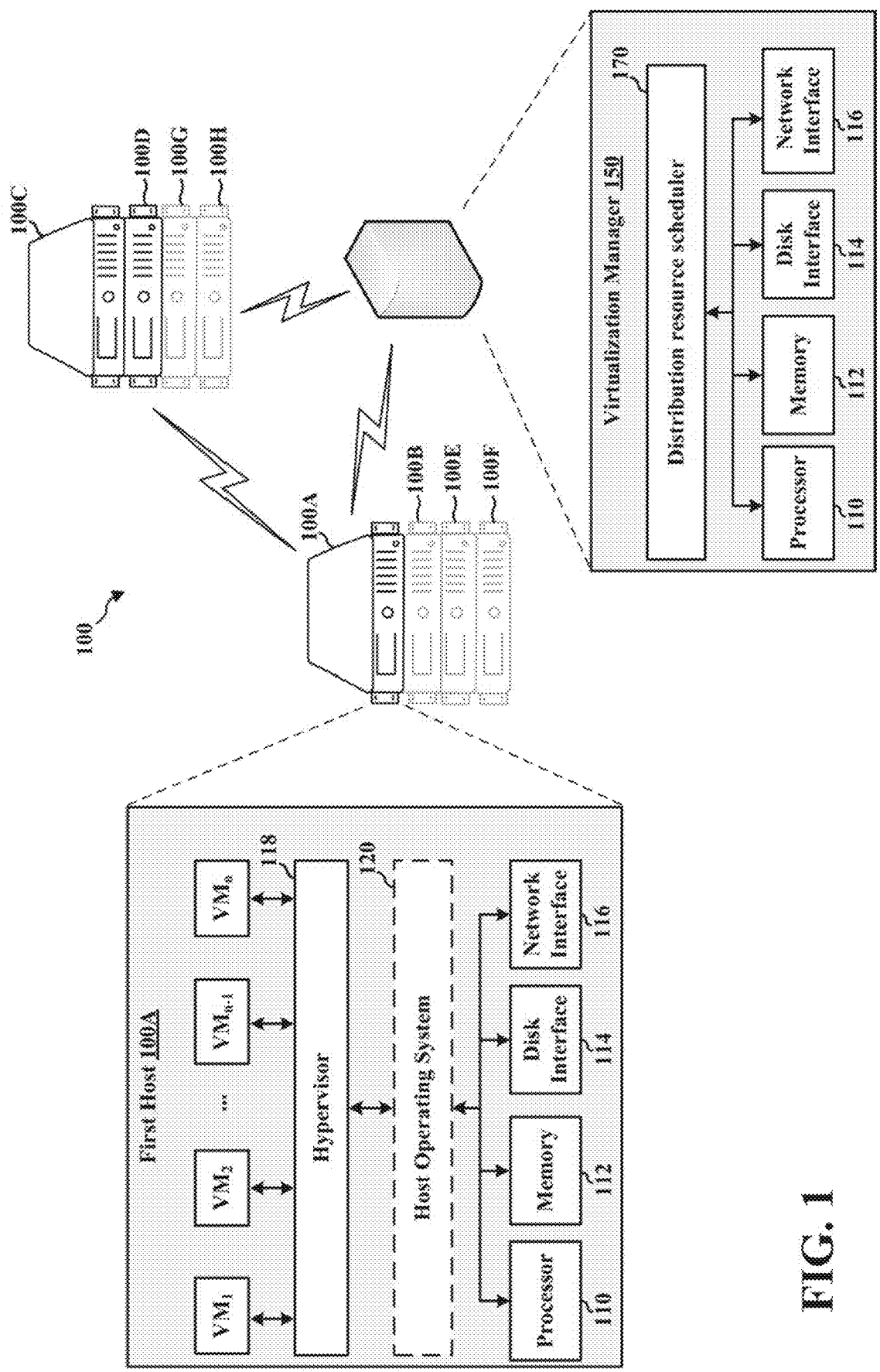
FIG. 1 illustrates a cluster of hosts according to an example of the present invention.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some examples, well-known structures and components are shown in block diagram form in order to avoid obscuring such concepts.

Examples of a technique that honors the virtual machine placement constraints during maintenances of a host within a cluster of hosts will now be presented with reference to various elements of apparatus and methods.

As described herein, a host represents resources of hardware and software architected in a standalone computing device. Often hosts include one or more multi-core processors and arrays of memory capable of simultaneously executing multiple processes. In addition to being standalone, a host can be networked in a cluster of hosts in some examples. A cluster of hosts represents a pool of aggregated resources (e.g., computing resources, memory resources) of a group of hosts, optionally, sharing a same network and/or storage (e.g., NAS, SAN). For example, if a group of eight hosts (e.g., computer nodes) with four dual-core CPUs each running at 4 GHz and 32GB of memory are networked into a cluster, the cluster has an aggregate 256 GHz of computing capacity and 256GB of memory available for running virtual machines.

A virtual machine (VM) is a software computer executed on a host that, like a physical computer, runs an operating system and applications. A host has the capability of running one or more virtual machines, where each virtual machine has a set of configuration files that are backed by the physical resources of the host. As such, virtual machines are architected to include one or more virtual devices that provide the same functionality as physical hardware.

In managing virtual machines, it is preferable in certain circumstances for two or more particular virtual machines to run on the same host. For example, users located on the West Coast may experience less latency when virtual machines are running on a single host located on the West Coast (e.g., locally). As such, an affinity rule setting is established that designates two or more particular virtual machines to remain on the same host (e.g., VMs kept together). In other circumstances, it is desirable for two or more particular virtual machines to not run on the same host. For example, virtual machines running on separate hosts can prevent simultaneous failure of those virtual machines in the event that a single host fails. As such, an anti-affinity rule setting is established that designates two or more particular virtual machines to remain on separate hosts (e.g., VMs kept apart). In this manner, VMs constrained by affinity rules share resources of a same host, and VMs constrained by anti-affinity rules do not share resources of a same host, but rather utilize resources of separate hosts, respectively. Other types of placement constraints may be observed as well. For example, one type of placement constraint is a ratio of virtual CPUs to physical CPUs. As another example, a type of placement constraint is resource reservations such as CPU and/or memory reservations. The present disclosure addresses the challenge of evacuating all the virtual machines (e.g., $VM_1$ through $VM_n$) of a first host to one or more other hosts in view of virtual machine placement constraints implemented in a virtualized computing environment of the cluster of hosts, such as the cluster of hosts.

In particular, examples described herein honor virtual machine placement constraints established on a first host by receiving a request to vacate one or more virtual machines from a first host by live migration to another host in a cluster and without violating the virtual machine placement constraints, identifying an architecture of the first host and provisioning a second host with an architecture compatible with that of the first host. Provisioning a host in this manner may, for instance, ensure that the firmware, hardware, and/or software of the hosts are compatible for a migration process. In general, capacities of hardware elements and software elements of the second host are equal to or greater than capacities of corresponding hardware and software elements of the first host, respectively. This serves to facilitate the migration of virtual machines from the first host to the second host without service interruption for both actively running (e.g., executing) virtual machines and inactive virtual machines.

By performing a migration process in this manner, examples of the present invention provide an intuitive and useful approach for handling VM placement constraints, for instance, during an upgrade. In particular, unlike existing systems, examples of the present invention are not limited by fragmentation. By way of example, in some existing systems, capacity in a cluster may be available among multiple hosts such that CPU and/or memory reservations of VMs being evacuated cannot be met, or at a minimum, must be compromised to allow for the evacuation. As another example, in some existing systems, constraints on resources, such as a constraint on the ratio of virtual CPUs to physical CPUs, may preclude a host from being fully evacuated (e.g., not all VMs can be evacuated off of the host without violating the constraints). In contrast, methods described herein provide for resource reservations to be satisfied by evacuating VMs from a first host to second host fully compatible with the first host (in which the second host has at least the capacity of the first host and, optionally, is at least as large as the largest host of the cluster) such that reservations and constraints are satisfied, as described in further detail below.

By way of example, during operation, one or more migrations may be triggered in anticipation of a maintenance operation. For instance, a migration can be triggered in anticipation of a reboot of a host to execute of one or more kernel updates. As another example, a migration can be triggered for subsequent installation of cold-plug hardware components, such as upgrades to random-access memory (RAM), central processing units (CPUs), one or more expansion cards (e.g., motherboards, daughter boards, backplanes), one or more power supplies, and/or any other hardware components of a host. Migrations can also be triggered to conserve resources, for instance, to evacuate a host to be removed from a cluster, thereby reducing resource demands.

Once a migration has been triggered for a first host, a second host is added to the cluster of hosts, and all VMs of the first host (e.g., $VM_1$ through $VM_n$) are migrated to the second host. In some examples, migration is performed using cold, suspended, and/or live migration. After the virtual machines are migrated to the second host, and the first host is determined (e.g., confirmed) to be evacuated, the first host is removed from the cluster of hosts. Thereafter, a maintenance operation (e.g., firmware upgrade) may be performed on the first host. Notably, the addition of the second host facilitates the evacuation of the one or more virtual machines on the host from the first host, without violating the virtual machine placement constraints (e.g., affinity and anti-affinity rules).

In some examples, after the maintenance operation has been completed, the one or more virtual machines (e.g., $VM_1$ through $VM_n$), previously migrated from first host to second host, are migrated from the second host to the first host. Once it is confirmed that the second host has been evacuated of all virtual machines, the second host is removed from the cluster of hosts.

FIG. 1 illustrates a cluster of hosts 100 according to an example of the present invention. As depicted in FIG. 1, the cluster of hosts 100 has a first host 100A, a third host 100C, a fourth host 100D, and a virtualization manager 150 that are interconnected and operable in a network. In this instance, the second host 100B, the fifth host 100E, the sixth host 100F, the seventh host 100G and the eighth host 100H are not included in the cluster of hosts 100 (e.g., powered off).

A host, typified as first host 100A, includes one or more processors 110, memory 112, one or more disk interfaces 114, and one or more network interfaces 116. In some examples, the one or more processors include at least one multi-core processor that is a single computing component with two or more independent processing units (i.e., cores), which read and execute program instructions.

The memory 112 is interconnected with the one or more processors 110 (e.g., by a bus) to provide access to data and one or more program instructions to be executed by the one or more processors 110. In some examples, memory 112 includes computer-readable storage medium. The computer-readable storage medium is, for example, tangible and non-transitory. In some examples, memory 112 includes volatile memory and/or non-volatile memory. Volatile memory include static random-access memory (SRAM), dynamic random-access memory (DRAM), advanced-random-access memory (A-RAM), synchronous dynamic random-access memory (SDRAM), and the like. Examples of volatile memory include double data rate (DDR), double data rate type two (DDR2), double data rate type three (DDR3), double data rate type four (DDR4), etc. Examples of non-volatile memory include flash (e.g., NAND, NOR) and electrically erasable programmable read-only memory (EEPROM).

The one or more disk interfaces 114 provides access to storage devices (e.g., hard disk drives, solid state drives) corresponding to the host 100A over bus types, including, but not limited to, parallel ATA (PATA, also called IDE or EIDE), Serial ATA (SATA), SCSI, Serial Attached SCSI (SAS), Fibre Channel, and the like. In some examples, the one or more disk interfaces 114 includes bridge circuitry to connect storage devices (e.g., hard disks) to non-native buses (e.g., IEEE 1394, USB, SCSI, Thunderbolt, etc.).

As depicted in FIG. 1, a host, typified as the first host 100A, includes a hypervisor 118 to implement virtual machines (e.g., $VM_1$ through $VM_n$) on the host 100A. In some examples, the hypervisor 118 is a type 1 bare metal hypervisor, which oversees the execution of one or more virtual machines (e.g., $VM_1$ through $VM_n$) while interacting directly with the resources (e.g., one or more processors 110, memory 112, one or more disk interfaces 114, and one or more network interfaces 116) utilized by the one or more virtual machines during operation. In some examples, the hypervisor 118 is a type 2 hypervisor that executes on the operating system 120.

As described, in some examples, hosts of the cluster 100 communicate over a communications network. The network providing connectivity between hosts can be a computer network, such as a local area network (LAN), a wide area network (WAN), a wireless local area network (WLAN), a metropolitan area network, (MAN), a system area network (SAN), or any combination thereof. In some examples, each network interface 116 is a high-speed interface and supports any known network communication protocol, such as Transmission Control Protocol (TCP) and the Internet Protocol (IP) (e.g., TCP/IP). In some examples, network devices configured to provide communication between hosts include, but are not limited to, photonic modules that support copper connectivity (e.g., coaxial copper) and both single-mode fibre (SMF) and multi-mode fibre (MMF) compatible devices.

As depicted in FIG. 1, a virtualization manager 150 can be implemented as a separate host in the cluster of hosts 100. In other examples, the virtualization manager 150 can be implemented in a VM executing on one of hosts (e.g., a first host 100A, a third host 100C, a fourth host 100D, etc.). For instance, in some examples, the virtualization manager 150 is virtualized on a virtual machine of a designated host. A first virtual machine $VM_1$ on the first host 100A can, for instance, be dedicated to run the virtualization manager 150.

As depicted in FIG. 1, the virtualization manager 150 includes a distributed resource scheduler 170 (DRS). In some examples, the distributed resource scheduler 170 is configured to adjust (e.g., balance) consumption of resources between hosts of the cluster of hosts 100. By way of example, the distributed resource scheduler 170 of the virtualization manager 150 can be configured to load balance virtual machines across hosts 100 of the cluster of hosts. Load balancing in this manner can include creating, deleting, and/or migrating virtual machines, for instance, in accordance with virtual machine placement constraints, as described.

For instance, in some examples, in order to optimize performance of the cluster of hosts 100, the distributed resource scheduler 170 compares cluster-level capacity (e.g., available resources) and host-level capacity to the demands of virtual machines running in the cluster of hosts 100 and balances load across the cluster by migrating active and inactive virtual machines between hosts. By way of example, if distributed resource scheduler 170 determines that the first host 100A is relatively constrained compared to each of the third host 100C and the fourth host 100D, the distributed resource scheduler 170 may migrate one or more virtual machines (e.g., $VM_1$ through $VM_n$) to one or both of to the third host 100C and the fourth host 100D.

Periodically, a host of the cluster 100 is scheduled for maintenance that triggers an evacuation of VMs of the host. For example, one or more kernel updates or security updates may require that the host is rebooted. In addition, hardware updates can also call for a reboot or power cycling procedure.

In some examples, an evacuation is automatically triggered for a host to reboot. In other examples, an evacuation is be triggered by an administrator. For example, an administrator can request for the first host 100A to be taken offline within a specified amount of time for an update (e.g., firmware upgrade, hardware upgrade, etc.). In either case, the distributed resource scheduler 170 receives the request and schedules for the first host 100A to be evacuated. In some examples, the distributed resource scheduler 170 schedules evacuation for a plurality of hosts (e.g., a first host 100A, a third host 100C, a fourth host 100D) within the cluster of hosts 100. Evacuation may be performed serially, concurrently, or in an otherwise overlapping manner.

In at least one example, the distributed resource scheduler 170 is configured to identify an architecture of the host selected for evacuation. For example, if the first host 100A is scheduled to be evacuated, the distributed resource scheduler 170 of the virtualization manager 150 queries the first host 100A for the architecture of the first host 100A. It should be appreciated that an architecture refers to a software architecture, a hardware architecture, or any combination thereof. For example, in response to the query above the architecture of the first host 100A may include either hardware (e.g., a type 1 bare metal hypervisor) or software (e.g., a type 2 hypervisor that executes on the operating system 120).

In some examples, the distributed resource scheduler 170 determines the software configuration of the host. By way of example, the distributed resource scheduler 170 determines that the software configuration of the first host 100A includes a hypervisor 118 and that the hypervisor has virtualized n-number of virtual machines (e.g., $VM_1$ through $VM_n$)

In some examples, the distributed resource scheduler 170 further determines the hardware configuration of the host 100A. The distributed resource scheduler 170 may, for instance, determine a capacity and/or type of the one or more processors 110, memory 112, one or more disk interfaces 114, and one or more network interfaces 116. In some examples, the distributed resource scheduler 170 is aware of at least part of the configuration of the host and need not query the host for the configuration of the host. For example, the distributed resource scheduler 170 can maintain a file with current configuration. In such an example, the distributed resource scheduler 170 can, optionally, confirm the accuracy of the information in the file and update accordingly.

In some examples, the distributed resource scheduler 170 is configured to determine an instruction set architecture of the first host. For example, the distributed resource scheduler 170 can determine that the a processor of the first host 100A has an instruction set architecture, such as x86-64. It should be appreciated that the response to the query provides sufficient information for the distributed resource scheduler 170 to determine other processor types such as x86-32, x86-64, z/Architecture, ARM, MIPS, Power Architecture (PowerPC), SPARC, Mill, Itanium (IA-64), Alpha, Prism, SuperH, V850, Clipper, VAX, Unicore, PA-RISC, MicroBlaze, and RISC-V.

In some examples, the distributed resource scheduler 170 is configured to determine a type of one or more memories (e.g., memory 112) of the first host 100A. For example, the distributed resource scheduler 170 can determine that the memory 112 of the first host 100A has a particular type of memory, such as double data rate type four (DDR4). It should be appreciated that the distributed resource scheduler 170 can determine other memory types, such as static random-access memory (SRAM), dynamic random-access memory (DRAM), advanced-random-access memory (A-RAM), synchronous dynamic random-access memory (SDRAM), and the like. Examples of volatile memory include double data rate (DDR), double data rate type two (DDR2), and double data rate type three (DDR3).

In some examples, the distributed resource scheduler 170 is configured to determine a capacity of one or more memories (e.g., memory 112) of the first host 100A. For example, the distributed resource scheduler 170 can determine that the total capacity of the memory 112 (e.g., 32GB of memory, 64GB of memory, etc.) of the first host 100A.

In some examples, the distributed resource scheduler 170 is configured to determine one or more disk interfaces 114 of the first host 100A. For example, the distributed resource scheduler 170 can determine the one or more disk interfaces 114 of the first host 100A such as a Serial ATA (SATA). Other disk interfaces include parallel ATA (PATA), SCSI, Serial Attached SCSI (SAS), Fibre Channel, and the like.

In some examples, the distributed resource scheduler 170 is configured to determine one or more disk capacities. For example, the distributed resource scheduler 170 can determine the total storage capacity (e.g., 100TB, 500TB, etc.) of one or more disks of the first host 100A. In such examples, the distributed resource scheduler 170 can also be configured to determine the type of a disk, such as a solid-state drive (SSD) or a hard disk drive (HDD).

In some examples, the distributed resource scheduler 170 is configured to determine characteristics of one or more network interfaces 116. For example, the distributed resource scheduler 170 can determine that the one or more network interfaces 116 is an Ethernet network interface. Other disk interfaces include Wi-Fi, Fibre Channel, ATM, FDDI, Token ring, ARCNET, and the like.

In some examples, the distributed resource scheduler 170 is configured to determine a firmware (e.g., firmware type, firmware version) of one or more hardware components. For example, the distributed resource scheduler 170 can determine a firmware version of the kernel of first host 100A. The distributed resource scheduler 170 compares the kernel firmware version of the first host 100A with a predetermined (e.g., latest) firmware version and determines whether the firmware version of the first host 100A corresponds to a particular version.

In some examples, the distributed resource scheduler 170 is configured to determine a physical location of a host. In some examples, the second host 100B is in physical proximity with the first host 100A, which can facilitate migration of virtual machines.

Figure 2:
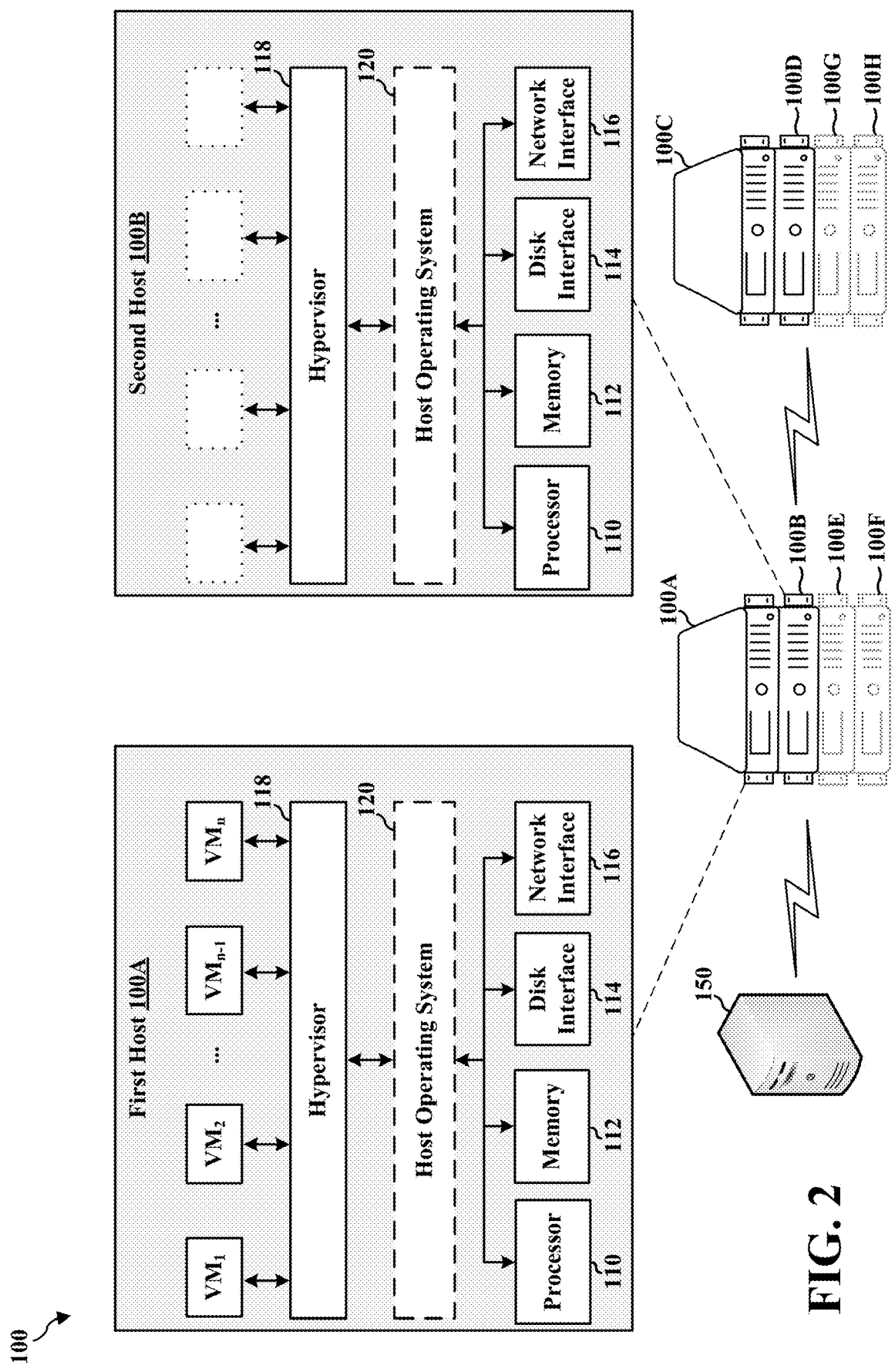
FIG. 2 illustrates hosts provisioned with compatible architectures according to an example of the present invention.

FIG. 2 illustrates a plurality of hosts provisioned with compatible architecture according to an example of the present invention. For example, after the distributed resource scheduler 170 of the virtualization manager 150 determines the architecture of the first host 100A, the distributed resource scheduler 170 provisions the second host 100B with an architecture that is compatible with the architecture of the first host 100A.

By way of example, as depicted in FIG. 2, the second host 100B includes one or more processors 110, memory 112, one or more disk interfaces 114, and/or one or more network interfaces 116, each of which is compatible with a respective corresponding component of the host 100A (e.g., the one or more processors 110 of the second host 100B is compatible with the one or more processors 110 of the first host 100A). The second host 100B includes a hypervisor 118 capable of running one ore more virtual machines (e.g., $VM_1$ through $VM_n$) and, optionally, includes an operating system 120 (recall a host includes an operating system if the hypervisor of the host is a type 2 hypervisor).

In some examples, the architecture of the first host 100A is the same as the architecture of the second host 100B. In some examples, the architecture of the first host 100A is different from the architecture of the second host 100B. For example, the one or more disk interfaces 114 of the first hosts 100A can be parallel ATA (e.g., PATA) whereas the one or more disk interfaces 114 of the second hosts 100B can be serial ATA (e.g., SATA). Notably, each disk interface is compatible with each other such that the architectural difference does not preclude VMs of host 100A from properly executing on host 100B after migration.

Once the second host 100B is provisioned, the distributed resource scheduler 170 adds the second host 100B to the cluster of hosts 100 as depicted in FIG. 2. Thereafter, VMs may be migrated from host 100A to host 100B such that host 100A may be removed from the cluster 100 for a maintenance operation, while observing virtual machine placement constraints of the migrated VMs.

Figure 3:
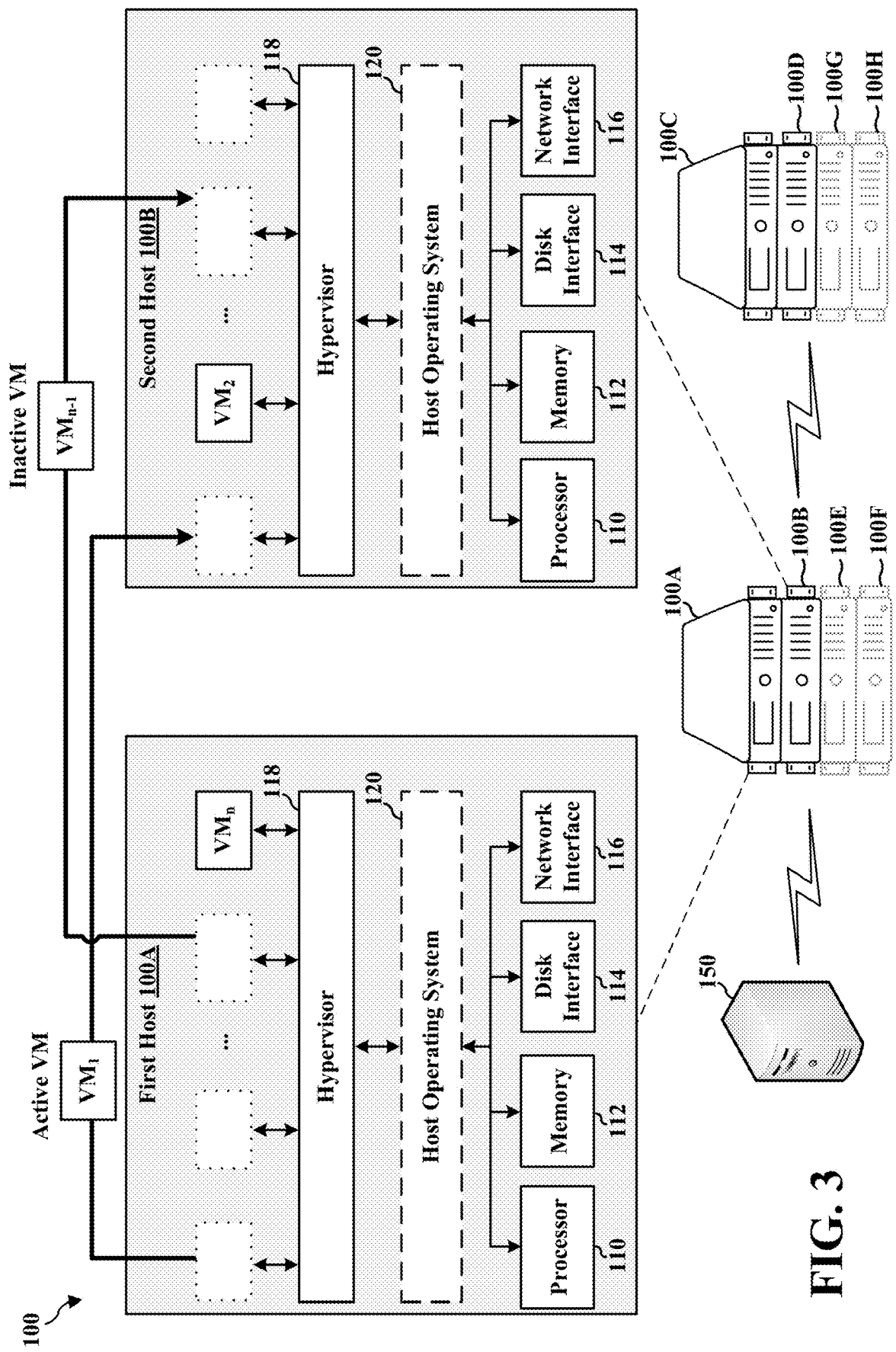
FIG. 3 illustrates the migration of active virtual machines and inactive virtual machines between hosts according to an example of the present invention.

FIG. 3 illustrates the migration of actively running virtual machines and inactive virtual machines from the first host (e.g., host 100A) to the provisioned second host (e.g., host 100B). The distributed resource scheduler 170 of the virtualization manager 150 migrates the one or more virtual machines (e.g., $VM_1$ through $VM_n$) from the first host 100A to the second host 100B until all VMs of the first host 100A have been evacuated. As described, migration performed in this manner includes cold, suspended, and/or live migration of the virtual machines In the example depicted in FIG. 3, the distribution resource scheduler 170 has already migrated the virtual machine $VM_2$ from the first host 100A to the second host 100B. Further, the virtual machine $VM_n$ is queued for migration, and $VM_1$ (active) and $VM_{n-1}$ (inactive) are being migrated concurrently.

Figure 4:
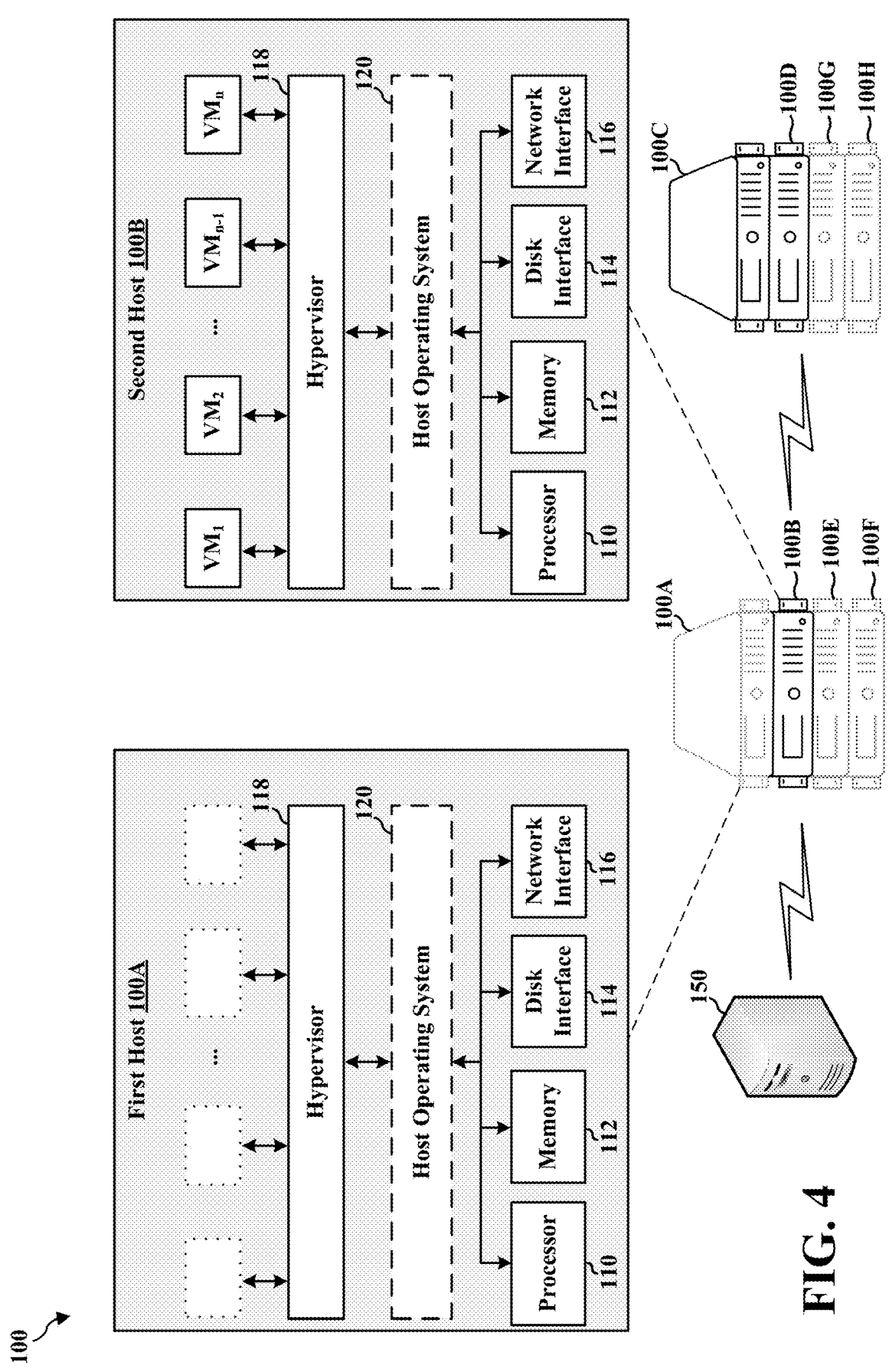
FIG. 4 illustrates a populated host and an evacuated host according to an example of the present invention.

FIG. 4 illustrates a populated second host 100B and an evacuated first host 100A that has subsequently been removed from the cluster 100 and powered down. For example, as described, once the distributed resource scheduler 170 of the virtualization manager 150 determines that virtual machines (e.g., $VM_1$ through $VM_n$) of the first host 100A have been evacuated, the distributed resource scheduler 170 causes the first host 100A to be removed from the cluster 100 and powered down. Thereafter, a maintenance operation is performed on the first host 100A. In some examples, the distributed resource scheduler 170 transmits a message (e.g., email, text message, etc.) to an administrator that the first host 100A is ready for the maintenance operation (e.g., hardware upgrades). In some examples, the distributed resource scheduler 170 executes (or causes execution of) one or more programs (e.g., routines) to upgrade firmware of one or more components of the host 100A.

Figure 5:
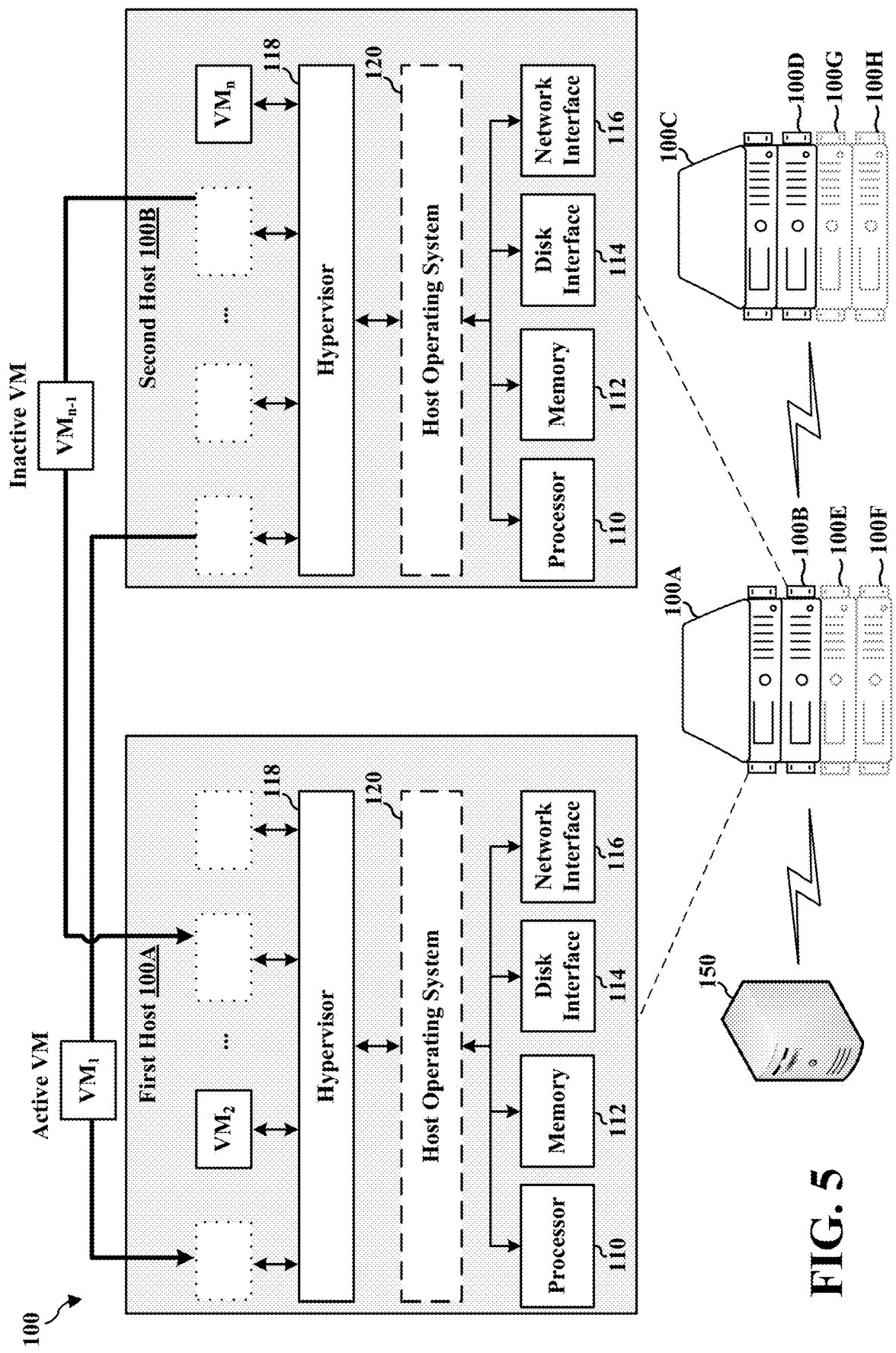
FIG. 5 illustrates the migration of active virtual machines and inactive virtual machines between hosts according to an example of the present invention.
Figure 6:
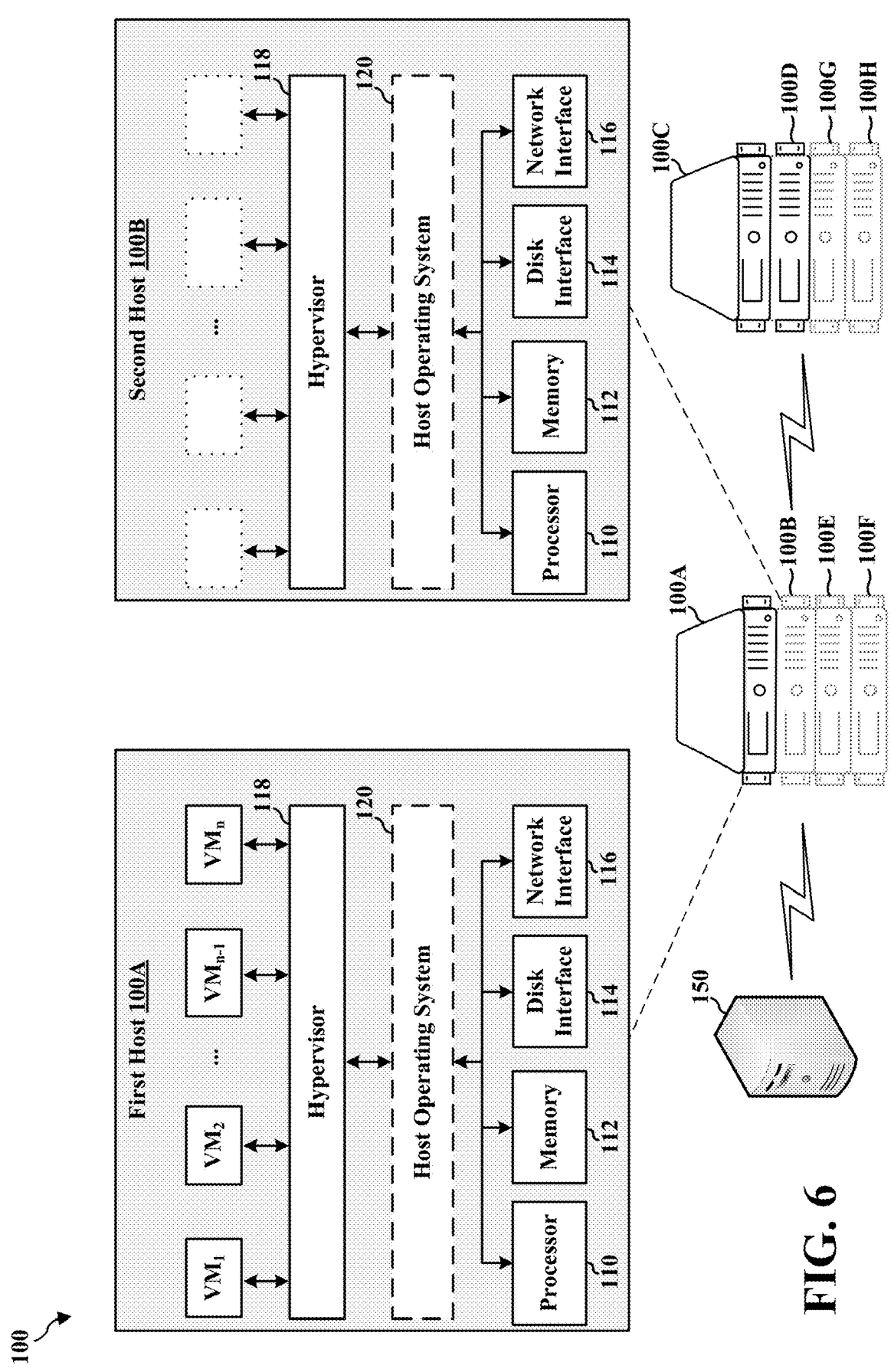
FIG. 6 illustrates a re-populated host and an evacuated host according to an example of the present invention.

FIG. 5 illustrates the migration of active virtual machines and inactive virtual machines from the second host 100B to the first host 100A. As described, VMs may be migrated from the second host to the first host following completion of a maintenance operation associated with the first host (recall that the VMs were migrated to the second host for the operation to be performed on an evacuated first host). Migration performed in this manner includes cold, suspended, and/or live migration. In an example operation, the distributed resource scheduler 170 of the virtualization manager 150 determines whether each newly migrated virtual machine is actively running on the first host 100A and whether each newly migrated inactive virtual machine has access to the resources required for proper execution on the first host 100A. If the distributed resource scheduler 170 determines that one or more virtual machines (e.g., $VM_1$ through $VM_n$) on the second host 100B have not been properly migrated, distributed resource scheduler 170 continues to migrate the remaining virtual machines (e.g., $VM_1$ through $VM_n$). If the distributed resource scheduler 170 determines that one or more virtual machines (e.g., $VM_1$ through $VM_n$) on the second host 100B have been evacuated, the distributed resource scheduler 170 of the virtualization manager 150 removes the second host 100B from the cluster of hosts 100, as shown in FIG. 6.

Figure 7:
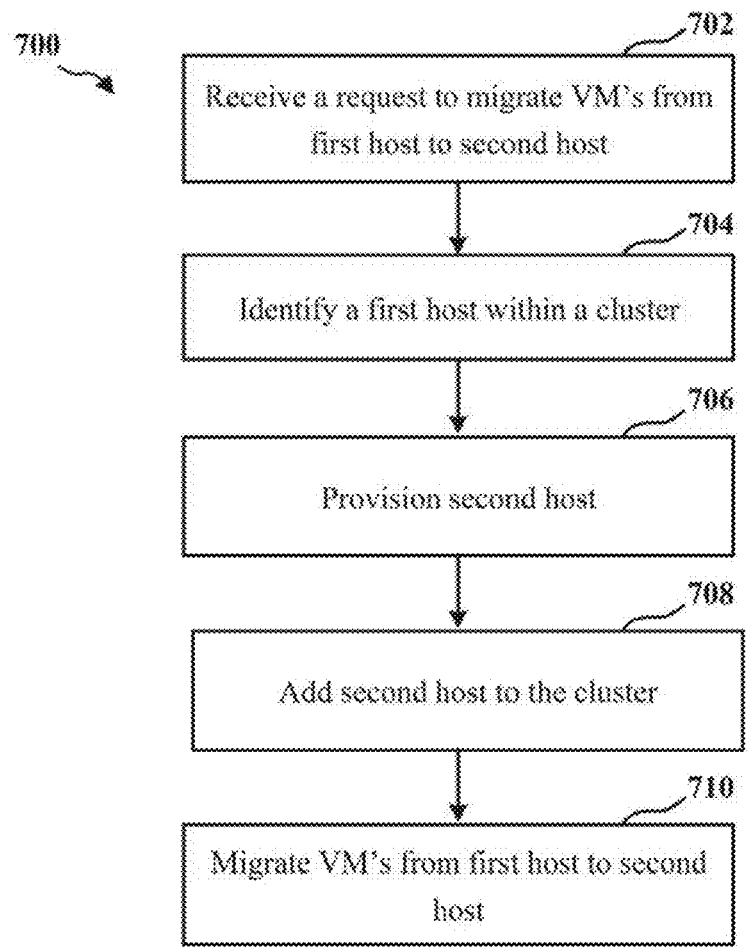
FIG. 7 is a flow diagram of a technique to perform maintenance on a first host of a cluster of hosts according to an example of the present invention.

FIG. 7 is a flow diagram of a technique to perform maintenance on a first host of a cluster of hosts according to an example of the present invention. Process 700 can be performed, for instance, by a virtualization management process (e.g., virtualization manager 150) that is in communication with one or more hosts (e.g., 100A-H) in a cluster of hosts 100 (e.g., a network). In some examples, the virtualization manager 150 is independent of a host interconnected with cluster of hosts 100 (e.g., a network) for honoring virtual machine placement constraints established on a first host. Independence from any given host within the cluster of hosts 100 may, for instance, alleviate a need to provision an interim virtualization manager or migrate a virtual machine running the virtualization manager when a host associated with the virtualization manager 150 is scheduled for maintenance.

At block 702, process 700 receives a request to migrate one or more virtual machines from the first host 100A to the second host 100B while honoring virtual machine placement constraints established on a first host. In some examples, the virtual machine placement constraints established on the first host include affinity and anti-affinity rules. In some examples, the virtual machine placement constraints established on the first host include a ratio of virtual CPUs to physical CPUs. In some examples, the virtual machine placement constraints established on the first host include one or more resource reservations such as CPU and/or memory reservations.

At block 704, without violating the virtual machine placement process 700 identifies a first host 100A within the cluster of hosts 100 (e.g., a network) for a maintenance operation. FIGS. 1-4 for example depict, that the first host 100A is identified to be taken offline and evacuated. In some examples, the request to migrate one or more virtual machines from a first host to a second host is in response to a maintenance operation that modifies the first host 100A as part of a rolling upgrade.

In some examples, determining the architecture of the host to be taken offline (e.g., the first host 100A depicted in FIG. 1) includes determining an instruction set architecture. For example, based on the information in the response to the request of the first host 100A, the distributed resource scheduler 170 can determine the instruction set architecture (e.g., x86-32bit, x86 64bit, etc.) for first host 100A.

In some examples, determining the architecture of the host to be taken offline (e.g., the first host 100A depicted in FIG. 1) includes determining a type of one or more memory. In some examples, determining the architecture of the host to be taken offline (e.g., the first host 100A depicted in FIG. 1) includes determining a type of a capacity of one or more memory. In some examples, determining the architecture of the host to be taken offline (e.g., the first host 100A depicted in FIG. 1) includes determining one or more disk interfaces. In some examples, determining the architecture of the host to be taken offline (e.g., the first host 100A depicted in FIG. 1) includes determining one or more disk capacities. In some examples, determining the architecture of the host to be taken offline (e.g., the first host 100A depicted in FIG. 1) includes determining one or more network interfaces. In some examples, determining the architecture of the host to be taken offline (e.g., the first host 100A depicted in FIG. 1) includes determining a firmware of one or more hardware components. In some examples, determining the architecture of the host to be taken offline (e.g., the first host 100A depicted in FIG. 1) includes determining a physical location. In some examples, the second host 100B is in physical proximity with the first host 100A.

At block 706, without violating the virtual machine placement process 700 provisions a second host 100B with an architecture that is compatible with the architecture of the first host 100A. In some examples, the architecture for the first host 100A is different than the architecture for the second host 100B. In some examples, a capacity of a hardware component of the second host 100B is equal to or greater than a capacity of a corresponding hardware component of the first host 100A. In some examples, a capacity of the second host 100B is equal to or greater than a capacity of a largest host within the cluster of hosts. Such examples ensure that virtual machines (e.g., actively running or non-actively running) on the first host 100A will not encounter hardware incompatibilities once migrated to the second host 100B.

At block 708, without violating the virtual machine placement process 700 adds the second host 100B to the cluster of hosts 100 (e.g., a network). For example, FIG. 2 depicts the second host 100B added to the cluster of hosts 100.

At block 710, without violating the virtual machine placement process 700 migrates one or more virtual machines from the first host 100A to the second host 100B. For example, as depicted in FIG. 3 the actively running virtual machine $VM_1$ and the actively virtual machine $VM_{n-1}$ are being migrated from the first host 100A to the second host 100B without service interruption. In some examples, the one or more virtual machines is actively running during migration from the first host 100A to the second host 100B.

In some examples, migrating the one or more virtual machines from the first host 100A to the second host 100B includes migrating the one or more virtual machines until the first host is evacuated. In some examples, process 700 further determines whether the one or more virtual machines on the first host 100A have been evacuated. In accordance with the determination that the one or more virtual machines on the first host have been evacuated, performing maintenance on the first host.

In some examples, process 700 further migrates the one or more virtual machines (e.g., $VM_1$ through $VM_n$) from the second host 100B to the first host 100A until the second host 100B is evacuated and then removes the second host 100B from the cluster of hosts 100.

Certain examples, as described above, solve a problem that it is not normally possible to perform rolling patch/upgrade without either violating distributed resource scheduling (DRS) VM placement constraints or failing the upgrade process and requesting administrator intervention. In some examples, the method includes injecting into the cluster a temporary host with the same compatibility as the largest existing host in the cluster (or at least as large as a host to be evacuated). As this will not reduce cluster capacity (most likely increasing it, actually) during the rolling upgrade, this ensures that the upgrade process does not introduce any VM-level placement constraints. The temporary host would be removed after the upgrade completes. This is distinct from the idea of injecting a new host to provide capacity. Instead, this method is about injecting equivalently compatible hosts (e.g., identically configured, same CPU, same types of devices, same storage availability, etc.) to ensure that it does not introduce new constraints during rolling upgrade.

Certain examples as described above involve a hardware abstraction layer implemented on top of a host computer. The hardware abstraction layer allows multiple contexts to share the hardware resource. In one example, these contexts are isolated from each other, each having at least a user application running therein. The hardware abstraction layer thus provides benefits of resource isolation and allocation among the contexts. In the foregoing examples, virtual machines are used as an example for the contexts and hypervisors as an example for the hardware abstraction layer. As described above, each virtual machine includes a guest operating system in which at least one application runs. It should be noted that these examples may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers It is understood that the specific order or hierarchy of blocks in the processes and/or flowcharts disclosed is an illustration of exemplary approaches. Based upon design preferences, it is understood that the specific order or hierarchy of blocks in the processes and/or flowcharts can be rearranged. Further, some blocks can be combined or omitted. The accompanying method claims present elements of the various blocks in a sample order, and are not meant to be limited to the specific order or hierarchy presented.

What is claimed is:

1. A non-transitory computer-readable storage medium storing one or more programs configured to be executed by one or more processors of an electronic device within a cluster of hosts for honoring virtual machine placement constraints established on a first host, the one or more programs including instructions for:
receiving a request to migrate one or more virtual machines from the first host to a second host; and
without violating the virtual machine placement constraints:
identifying an architecture and capacity of hardware elements and software elements of the first host;
provisioning the second host with an architecture that is compatible with the architecture of the first host and capacity of hardware elements and software elements that are at least equal to the capacity of the hardware elements and the software elements of the first host;
adding the second host to the cluster of hosts; and
migrating the one or more virtual machines from the first host to the second host;
in accordance with the determination that the one or more virtual machines on the first host have been evacuated, performing maintenance on the first host; and
subsequent to performing maintenance on the first host:
power cycling the first host;
migrating the one or more virtual machines from the second host to the first host until the second host is evacuated; and
removing the second host from the cluster of hosts.

2. The non-transitory computer-readable storage medium of claim 1, wherein the virtual machine placement constraints established on the first host include affinity and anti-affinity rules.

3. The non-transitory computer-readable storage medium of claim 2, wherein migrating the one or more virtual machines from the first host to the second host includes migrating the one or more virtual machines from the first host to the second host without violating affinity and anti-affinity rules.

4. The non-transitory computer-readable storage medium of claim 1, wherein the virtual machine placement constraints established on the first host include a ratio of virtual CPUs to physical CPUs.

5. The non-transitory computer-readable storage medium of claim 1, wherein the virtual machine placement constraints established on the first host include one or more resource reservations.

6. The non-transitory computer-readable storage medium of claim 1, wherein the electronic device is a server and the one or more programs correspond to a distributed resource scheduler.

7. The non-transitory computer-readable storage medium of claim 1, wherein the one or more programs further include instructions for determining an architecture of the first host.

8. The non-transitory computer-readable storage medium of claim 7, wherein determining the architecture of the first host includes determining a type of a processor of the first host.

9. The non-transitory computer-readable storage medium of claim 7, wherein determining the architecture of the first host includes determining an instruction set architecture of the first host.

10. The non-transitory computer-readable storage medium of claim 7, wherein determining the architecture of the first host includes determining a type of one or more memory of the first host.

11. The non-transitory computer-readable storage medium of claim 7, wherein determining the architecture of the first host includes determining a capacity of one or more memory of the first host.

12. The non-transitory computer-readable storage medium of claim 7, wherein determining the architecture of the first host includes determining one or more disk interfaces of the first host.

13. The non-transitory computer-readable storage medium of claim 7, wherein determining the architecture of the first host includes determining one or more disk capacities.

14. The non-transitory computer-readable storage medium of claim 7, wherein determining the architecture of the first host includes determining one or more network interfaces.

15. The non-transitory computer-readable storage medium of claim 7, wherein determining the architecture of the first host includes determining a firmware of one or more hardware components.

16. The non-transitory computer-readable storage medium of claim 7, wherein determining the architecture of the first host includes determining a physical location of the first host.

17. The non-transitory computer-readable storage medium of claim 16, wherein the second host is in physical proximity with the first host.

18. The non-transitory computer-readable storage medium of claim 1, wherein identifying the architecture of the first host includes identifying hardware architecture and software architecture of the first host.

19. The non-transitory computer-readable storage medium of claim 1, wherein a capacity of the second host is equal to or greater than a capacity of a largest host within the cluster of hosts.

20. The non-transitory computer-readable storage medium of claim 1, wherein the request to migrate one or more virtual machines from a first host to a second host is in response to a maintenance operation that modifies the first host as part of a rolling upgrade.

21. The non-transitory computer-readable storage medium of claim 1, wherein the one or more virtual machines is actively running during migration from the first host to the second host.

22. The non-transitory computer-readable storage medium of claim 1, wherein the architecture for the first host is different than the architecture for the second host.

23. The non-transitory computer-readable storage medium of claim 1, wherein migrating the one or more virtual machines from the first host to the second host includes migrating the one or more virtual machines until the first host is evacuated.

24. An electronic device within a cluster of hosts for honoring virtual machine placement constraints established on a first host, comprising:
a network interface;
a disk interface surface;
one or more processors; and memory storing one or more programs configured to be executed by the one or more processors, the one or more programs including instructions for:
receiving a request to migrate one or more virtual machines from the first host to a second host; and
without violating the virtual machine placement constraints:
identifying an architecture and capacity of hardware elements and software elements of the first host;
provisioning the second host with an architecture that is compatible with the architecture of the first host and capacity of hardware elements and software elements that are at least equal to the capacity of the hardware elements and the software elements of the first host;
adding the second host to the cluster of hosts; and
migrating the one or more virtual machines from the first host to the second host;
in accordance with the determination that the one or more virtual machines on the first host have been evacuated, performing maintenance on the first host; and
subsequent to performing maintenance on the first host:
power cycling the first host;
migrating the one or more virtual machines from the second host to the first host until the second host is evacuated; and
removing the second host from the cluster of hosts.

25. A method of honoring virtual machine placement constraints established on a first host within a cluster of hosts, the method comprising:
receiving a request to migrate one or more virtual machines from the first host to a second host; and
without violating the virtual machine placement constraints:
identifying an architecture and capacity of hardware elements and software elements of the first host;
provisioning the second host with an architecture that is compatible with the architecture of the first host and capacity of hardware elements and software elements that are at least equal to the capacity of the hardware elements and the software elements of the first host;
adding the second host to the cluster of hosts; and
migrating the one or more virtual machines from the first host to the second host;
in accordance with the determination that the one or more virtual machines on the first host have been evacuated, performing maintenance on the first host; and
subsequent to performing maintenance on the first host:
power cycling the first host;
migrating the one or more virtual machines from the second host to the first host until the second host is evacuated; and
removing the second host from the cluster of hosts.

26. The non-transitory computer-readable storage medium of claim 1, wherein provisioning the second host with the architecture that is compatible with the architecture of the first host and the capacity of hardware elements and software elements that are at least equal to the capacity of the hardware elements and the software elements of the first host includes curbing the virtual machine placement constraints on the second host to the virtual machine placement constraints implemented on the first host.

* * * * *